(12) United States Patent
Gold et al.

(10) Patent No.: US 12,197,607 B1
(45) Date of Patent: Jan. 14, 2025

(54) ACCESSING DATA FROM ELECTRONIC DISCOVERY APPLICATIONS

(71) Applicant: BDO USA, LLP, Oak Brook, IL (US)

(72) Inventors: Daniel E. Gold, Overland Park, KS (US); Walter John Hogan, Oswego, IL (US)

(73) Assignee: BDO USA, LLP, Oak Brook, IL (US)

( * ) Notice: Subject to any disclaimer, the term of this patent is extended or adjusted under 35 U.S.C. 154(b) by 206 days.

(21) Appl. No.: 17/591,557

(22) Filed: Feb. 2, 2022

(51) Int. Cl.
*G06F 21/62* (2013.01)
*G06F 21/31* (2013.01)
*G06F 21/60* (2013.01)

(52) U.S. Cl.
CPC .......... *G06F 21/6218* (2013.01); *G06F 21/31* (2013.01); *G06F 2221/2141* (2013.01)

(58) Field of Classification Search
CPC ......... G06F 21/6218; G06F 21/62; G06F 7/04
USPC .......................................................... 726/27
See application file for complete search history.

(56) References Cited

U.S. PATENT DOCUMENTS

| | | | | |
|---|---|---|---|---|
| 2011/0264677 A1* | 10/2011 | Hermitage | ............ | G06F 40/106 707/E17.014 |
| 2014/0033324 A1* | 1/2014 | Kiang | ..................... | H04L 67/59 726/27 |
| 2019/0149535 A1* | 5/2019 | Greetham | ............... | H04L 67/75 726/7 |
| 2021/0064485 A1* | 3/2021 | Rana | .................... | G06F 11/2048 |
| 2021/0064486 A1* | 3/2021 | Rana | .................... | G06F 11/1484 |
| 2021/0191629 A1* | 6/2021 | Vibhor | .................. | G06F 3/0659 |
| 2021/0264349 A1* | 8/2021 | Marappagounder | | G06Q 10/06313 |
| 2021/0271686 A1* | 9/2021 | Abdul Rasheed | .. | G06F 11/1451 |
| 2022/0043907 A1* | 2/2022 | Saliba | ................... | G06F 21/552 |
| 2022/0245034 A1* | 8/2022 | Nara | .................... | G06F 11/1469 |
| 2022/0245268 A1* | 8/2022 | Dhawan | ............. | G06F 21/6209 |
| 2023/0124827 A1* | 4/2023 | Dornemann | ........ | G06F 9/45558 711/162 |

FOREIGN PATENT DOCUMENTS

| | | | | |
|---|---|---|---|---|
| GB | 2541040 A | * | 2/2017 | ........... G06F 16/256 |
| WO | WO-2022051391 A1 | * | 3/2022 | ........... G06F 16/332 |

* cited by examiner

*Primary Examiner* — Haresh N Patel
(74) *Attorney, Agent, or Firm* — McDermott Will & Emery LLP

(57) ABSTRACT

Various aspects of the subject technology relate to systems, methods, and machine-readable media for granting access to cases for users through a common data model that brings together data from multiple e-discovery applications. The method includes associating a user with a case number. The method includes assigning a case name to each case number. The method includes associating contact information of the user with the case number. The method includes receiving a request to access the case number. The method includes, in response to receiving the request, issuing an access link to the user. The method includes authenticating the user based on at least the access link. The method includes granting access to the case number based on the contact information. The method includes generating data insights regarding the case number. The method includes causing display of the data insights through a user interface.

20 Claims, 10 Drawing Sheets

100

| Cases 102 | 104 | 106 |
|---|---|---|
| Client Name | Case Number | Case Name |
| Client A (102a) | A123 (104a) | Case1 (106a) |
| Client A (102a) | A124 (104b) | Case2 (106b) |
| Client B (102b) | B120 (104c) | Case3 (106c) |
| Client B (102b) | B121 (104d) | Case4 (106d) |

| Users 112 | 114 | 116 |
|---|---|---|
| Email | First Name | Case Name |
| johndoe@clienta.com (112a) | John (114a) | Doe (116a) |
| janedoe@clientb.com (112b) | Jane (114b) | Doe (116b) |
| admin@domain.com (112c) | Daniel (114c) | Gold (116c) |

Case Access 104 112

| Case Number | Email |
|---|---|
| A123 | johndoe@clienta.com |
| A124 | johndoe@clienta.com — 112a |
| B120 | janedoe@clientb.com |
| B121 | janedoe@clientb.com — 112b |
| A123 | admin@domain.com |
| A124 | admin@domain.com |
| B120 | admin@domain.com — 112c |
| B121 | admin@domain.com |

ACCESSING DATA FROM ELECTRONIC DISCOVERY APPLICATIONS

BACKGROUND

Electronic discovery (e-discovery) conventionally refers to discovery in legal proceedings such as litigation, government investigations, Freedom of Information Act requests, and the like, where the information sought is in electronic format. This electronic information is often referred to as electronically stored information (ESI), and typically includes data such as emails, documents, presentations, databases, voicemail, audio files, video files, social media, and/or websites.

E-discovery is subject to rules of civil procedure and agreed-upon processes, often involving review for privilege and relevance before data are turned over to a requesting party. Therefore, it is important to maintain privileges and ensure security and separation of access to data files during e-discovery.

BRIEF SUMMARY

According to one embodiment of the present disclosure, a computer-implemented method is provided for granting access to cases for users through a common data model that brings together data from multiple e-discovery applications. The method includes associating at least one user of a plurality of users with at least one case number. The method includes assigning a case name to each case number. The method includes associating contact information of the at least one user with the at least one case number. The method includes receiving a request to access the at least one case number from the at least one user. The method includes, in response to receiving the request, issuing an access link to the at least one user. The method includes authenticating the at least one user based on at least the access link. The method includes granting access, for the at least one user, to the at least one case number based on the contact information of the at least one user. The method includes generating data insights regarding the at least one case number. The method includes causing display of the data insights through a user interface.

According to one embodiment of the present disclosure, a system is provided including a processor and a memory comprising instructions stored thereon, which when executed by the processor, causes the processor to perform a method for granting access to cases for users through a common data model that brings together data from multiple e-discovery applications. The method includes associating at least one user of a plurality of users with at least one case number. The method includes assigning a case name to each case number. The method includes associating contact information of the at least one user with the at least one case number. The method includes receiving a request to access the at least one case number from the at least one user. The method includes, in response to receiving the request, issuing an access link to the at least one user. The method includes authenticating the at least one user based on at least the access link. The method includes granting access, for the at least one user, to the at least one case number based on the contact information of the at least one user. The method includes generating data insights regarding the at least one case number. The method includes causing display of the data insights through a user interface.

According to one embodiment of the present disclosure, a non-transitory computer-readable storage medium is provided including instructions (e.g., stored sequences of instructions) that, when executed by a processor, cause the processor to perform a method for granting access to cases for users through a common data model that brings together data from multiple e-discovery applications. The method includes associating at least one user of a plurality of users with at least one case number. The method includes assigning a case name to each case number. The method includes associating contact information of the at least one user with the at least one case number. The method includes receiving a request to access the at least one case number from the at least one user. The method includes, in response to receiving the request, issuing an access link to the at least one user. The method includes authenticating the at least one user based on at least the access link. The method includes granting access, for the at least one user, to the at least one case number based on the contact information of the at least one user. The method includes generating data insights regarding the at least one case number. The method includes causing display of the data insights through a user interface.

According to one embodiment of the present disclosure, a system is provided that includes means for storing instructions, and means for executing the stored instructions that, when executed by the means, cause the means to perform a method for granting access to cases for users through a common data model that brings together data from multiple e-discovery applications. The method includes associating at least one user of a plurality of users with at least one case number. The method includes assigning a case name to each case number. The method includes associating contact information of the at least one user with the at least one case number. The method includes receiving a request to access the at least one case number from the at least one user. The method includes, in response to receiving the request, issuing an access link to the at least one user. The method includes authenticating the at least one user based on at least the access link. The method includes granting access, for the at least one user, to the at least one case number based on the contact information of the at least one user. The method includes generating data insights regarding the at least one case number. The method includes causing display of the data insights through a user interface.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A illustrates an exemplary diagram of case data, according to certain aspects of the present disclosure.

FIG. 1B illustrates an exemplary diagram of user data, according to certain aspects of the present disclosure.

FIG. 1C illustrates an exemplary diagram for granting access to cases for users, according to certain aspects of the present disclosure.

Figure 2A:
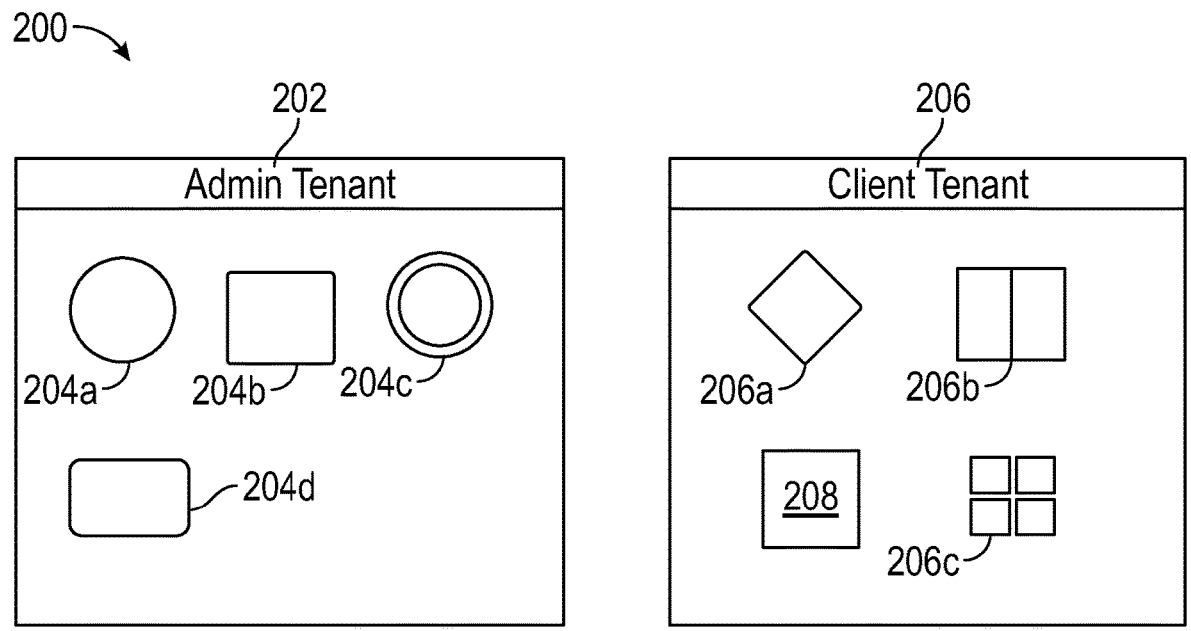
FIG. 2A illustrates an exemplary system diagram for granting access to cases for users, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Electronic discovery (e-discovery) conventionally refers to discovery in legal proceedings such as litigations, government investigations, Freedom of Information Act requests, and the like, where the information sought is in electronic format. This electronic information is often referred to as electronically stored information (ESI), and typically includes data such as emails, documents, presentations, databases, voicemail, audio files, video files, social media, and/or websites.

E-discovery is subject to rules of civil procedure and agreed-upon processes, often involving review for privilege and relevance before data are turned over to a requesting party. Therefore, it is important to maintain privileges and ensure security and separation of access to data files during e-discovery.

Conventionally, legal teams utilize large amounts of spreadsheets to manage and monitor their e-discovery spending and e-discovery data volumes across multiple law firms and legacy e-discovery service providers. However, the lack of key insights in any investigation, regulatory compliance matter, and/or litigation makes it increasingly difficult to craft data-driven decisions.

Currently, there is no other program or application that brings together, in one common data model, data points from multiple e-discovery platforms into one dynamic, graphical user interface. Aspects of the present disclosure are directed to an intelligent dashboard application that solves the data transparency problem in the e-discovery market. For example, legal professionals currently cannot pull similar graphical business intelligence data out of MICROSOFT® ADVANCED E-DISCOVERY and RELATIVITY® because of the platform's existing limitations. Additionally, legal professionals do not have the ability with existing technology to view data points from multiple e-discovery platforms all in one location. Aspects of the present disclosure allows the user to view data of multiple e-discovery platforms through a single business intelligence interface.

Aspects of the subject disclosure solve the above shortcomings by surfacing up data insights across multiple e-discovery databases, such as MICROSOFT® ADVANCED E-DISCOVERY and RELATIVITY®. These insights may also be conveniently presented through a single dynamic graphical user interface (GUI). For example, the dynamic GUI may surface data insights from various areas of e-discovery, such as, including, but not limited to, legal holds, collections, processing sets, and/or review sets.

The disclosed system addresses a problem in traditional e-discovery tied to computer technology, namely, the technical problem of surfacing data insights across multiple unrelated e-discovery databases. The disclosed system solves this technical problem by providing a solution also rooted in computer technology, namely, by providing for a technique for granting access to cases for users. The disclosed system also improves the functioning of the computer itself by surfacing data insights across multiple unrelated e-discovery databases.

FIG. 1A illustrates an exemplary diagram of case data 100, according to certain aspects of the present disclosure. The case data 100 may include client names 102 (e.g., clients), case numbers 104, and case names 106. It is understood that additional case data 100 may be included without departing from the scope of the present disclosure.

According to aspects, the case data 100 may be arranged such that each client name 102 is associated with a case number 104 and a case name 106. For example, as illustrated in FIG. 1A, a first client 102*a* may be associated with a first case number 104*a* and a first case name 106*a*. The first client 102*a* may also be associated with a second case number 104*b* and a second case name 106*b*. Similarly, a second client 102*b* may be associated with a third case number 104*c* and a third case name 106*c*. The second client 102*b* may also be associated with a fourth case number 104*d* and a fourth case name 106*d*.

In this way, each client may be correlated with permissions for each case. Additionally, each case number may be correlated with each case name in an organized manner. For example, the first client 102*a* may have permission to access the first case number 104*a* corresponding to the first case name 106*a*. The first client 102*a* may also have permission to access the second case number 104*b* corresponding to the second case name 106*b*. Similarly, the second client 102*b* may have permission to access the third case number 104*c* corresponding to the third case name 106*c*. The second client 102*b* may also have permission to access the fourth case number 104*d* corresponding to the fourth case name 106*d*.

FIG. 1B illustrates an exemplary diagram of user data 110, according to certain aspects of the present disclosure. For example, user emails 112 may be associated with a first name 114 and a last name 116 of a user. It is understood that additional user information may be included without departing from the scope of the present disclosure.

According to aspects, a first email 112*a* may be associated with a first first name 114*a* and a first last name 116*a*. A second email 112*b* may be associated with a second first name 114*b* and a second last name 116*b*. A third email 112*c* may be associated with a third first name 114*c* and a third last name 116*c*. For example, the first email 112*a* may be for the first client 102*a* and the second email 112*b* may be for the second client 102*b*. Additionally, the third email 112*c* may be for an administrator.

In an implementation, the administrator may have access to either or both of the case data 102 associated with either or both of the first client 102*a* and/or second client 102*b* based on permission(s) from the clients 102. The administrator may also have access to administrator tools and/or features that may not be accessible by the clients 102.

FIG. 1C illustrates an exemplary access table 120 for granting access to cases for users, according to certain aspects of the present disclosure. The access table 120 may be generated based on the case data 100 of FIG. 1A and the user data 110 of FIG. 1B. For example, the user associated with the first email 112a may be granted access to the first case number 104a and the second case number 104b based on the case data 100 and the user data 110. Similarly, the user associated with the second email 112b may be granted access to the third case number 104c and the fourth case number 104d based on the case data 100 and the user data 110. Additionally, the administrator associated with the third email 112c may be granted access to the first case number 104a, the second case number 104b, the third case number 104c, and the fourth case number 104d.

As a result, row-level security may be implemented based on the case data 100 and the user data 110. For example, the access table 120 may be utilized to determine what data should be included in dashboards displayed to each user.

It is understood that more or less than two clients may be supported without departing from the scope of the disclosure. It is also understood that each client may be given access to more or less than two cases without departing from the scope of the disclosure.

It is further understood that more or less than four total cases may be supported without departing from the scope of the disclosure. It is further understood that more than one administrator may be included, with each administrator having the same, overlapping, and/or different access to each of the cases without departing from the scope of the disclosure.

FIG. 2A illustrates an exemplary case management system 200 for granting access to cases for users, according to certain aspects of the present disclosure. For example, the system 200 may include multiple services 204 hosted by an administrator tenant 202.

In an implementation, a client tenant 206 may utilize the services 204 hosted by the administrator tenant 202. For example, the services 204 may include, but is not limited to, administrator-hosted instances of legal compliance software 204a (e.g., RELATIVITY®, and the like), cloud services/storage platforms 204b (e.g., AZURE®, and the like), business analytics services 204c (e.g., POWER BI®, and the like), and/or other web resources 204d (e.g., web applications, web jobs, and the like).

According to aspects, identity managers 206a (e.g., AZURE AD®, and the like), business communication platforms 206b (MICROSOFT TEAMS®, SLACK®, and the like), e-discovery services 206c (e.g., MICROSOFT® ADVANCED EDISCOVERY, and the like) and other services 208 may be hosted in the client tenant 206. Authentication may also be done against directory services of the client tenant 206 as well. It is understood that additional services may be hosted in each of the administrator tenant and/or the client tenant without departing from the scope of the disclosure.

According to aspects, users may access the administrator tenant 202 via their own client tenant (e.g., client tenant 204) in several ways, including, but not limited to, a direct web URL in the user's browser, business communication platforms (e.g., MICROSOFT TEAMS®, SLACK®, and the like, which may be added as web content to a tab), and/or through legal compliance software (e.g., RELATIVITY®, and the like).

According to aspects, access to the administrator services may be in the form of a web request. For example, the web application will check if the user is already authenticated. If the user is not already authenticated, a sign-in request is sent to the client tenant 206 (e.g., via an identity manager, AZURE AD®, or the like). The user may then log in with their existing credentials. If the user is already authenticated, the request for the administrator services dashboard continues.

According to aspects, authentication and user identity may be validated through legal compliance software (e.g., RELATIVITY®, or the like). For example, a user is already authenticated with RELATIVITY® before gaining access to the administrator services content embedded in the application. The user identity which was used to log into RELATIVITY® is what is used for access to the administrator services.

Figure 2B:
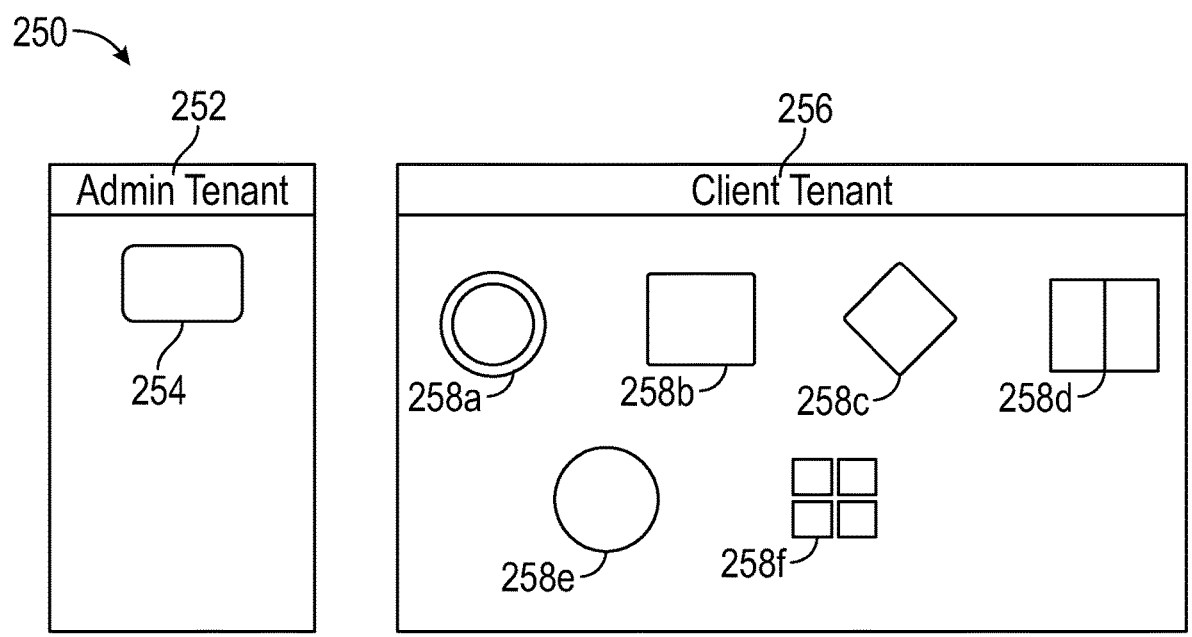
FIG. 2B illustrates another exemplary system diagram for granting access to cases for users, according to certain aspects of the present disclosure.

FIG. 2B illustrates another exemplary case management system 250 for granting access to cases for users, according to certain aspects of the present disclosure. For example, services 258 of the system 250 may be primarily hosted on a client tenant 256, and partially hosted on an administrator tenant 252.

According to aspects, the client tenant 256 may host instances cloud services/storage platforms 258a (e.g., AZURE®, and the like), identity managers 258b (e.g., AZURE AD®, and the like), business communication platforms 258c (MICROSOFT TEAMS®, SLACK®, and the like), legal compliance software 258d (e.g., RELATIVITY®, and the like), e-discovery services 258e (e.g., MICROSOFT® ADVANCED EDISCOVERY, and the like), and/or other web resources 258f (e.g., web applications, web jobs, and the like). The administrator tenant 252 may host of an instance of a business analytics service 254 (e.g., POWER BI®, and the like).

According to aspects, the client tenant 256 may provision resources utilized for the administrator services in their own cloud environment. For example, the legal compliance software 258d (e.g., RELATIVITY®, and the like) can be hosted in the administrator instance or the client instance. In an implementation, e-discovery services (e.g., MICROSOFT® ADVANCED EDISCOVERY, and the like) is hosted in the client tenant 256. Authentication may be done against the client directory service as well.

According to aspects, the client may have an AZURE® tenant and subscription. For example, the administrator system may access the client AZURE® environment to provision services and deploy administrator services (e.g., access to cases 120). In an implementation, the client may provide credentials for connecting to MICROSOFT® ADVANCED EDISCOVERY instances (e.g., for Application Programming Interface (API) access). If not using a RELATIVITY® instance (or the like), the client may provide credentials for connecting to the RELATIVITY® instance (e.g., for API access). In an aspect, the client may configure AZURE® registration (or the like) for authentication, and redirect to the administrator application if using their directory services.

Figure 3A:
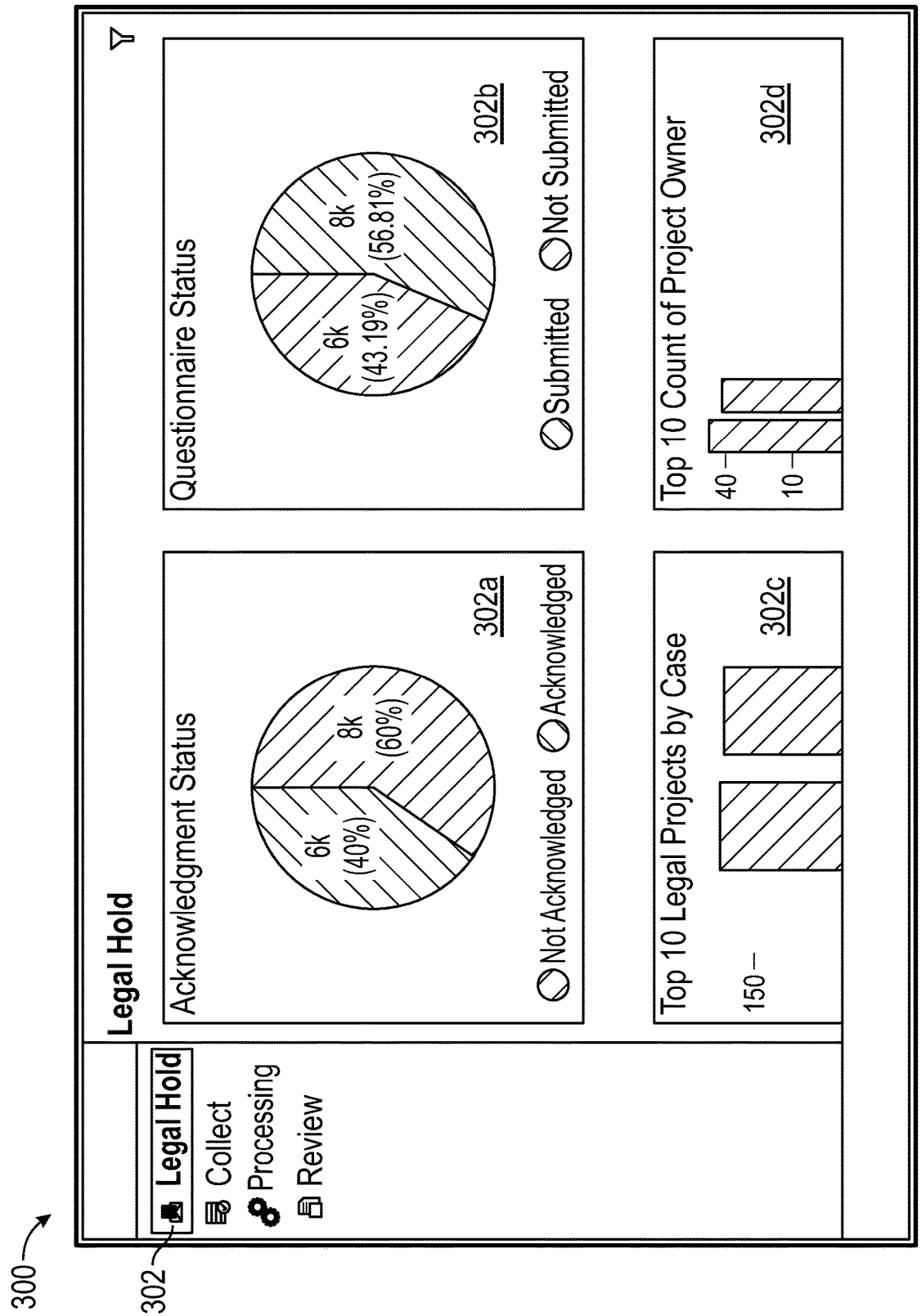
FIGS. 3A-3D illustrate exemplary graphical user interfaces (GUIs) for generating and displaying data insights to users, according to certain aspects of the present disclosure.

FIGS. 3A-3D illustrate exemplary graphical user interfaces 300 (GUIs) for granting access to cases and generating/displaying data insights for users, according to certain aspects of the present disclosure. Referring to FIG. 3A, a GUI 300 may display data insights including legal holds 302. For example, the legal holds 302 may include acknowledgment status 302a, questionnaire status 302b, top legal projects 302c, top count of project owner 302d, etc. According to aspects, each of the acknowledgment status 302a, questionnaire status 302b, top legal projects 302c, top count of project owner 302d, etc., may be displayed graphically as a chart.

Figure 3B:
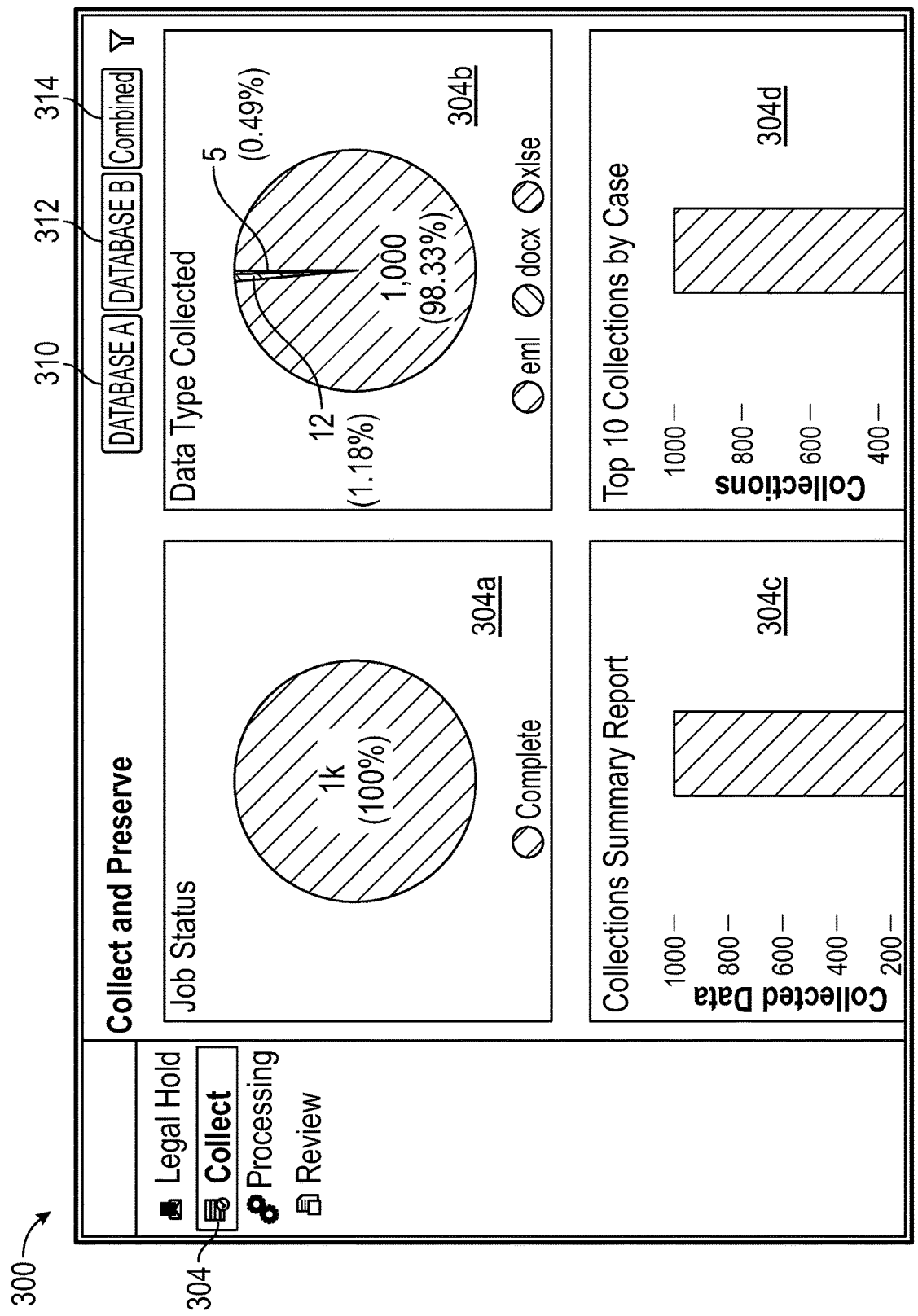

Referring to FIG. 3B, the GUI 300 may also display data insights including collections 304. For example, the collections 304 may include job status 304a, data type collected 304b, collections summary report 304c, top collections by case 304d, etc. According to aspects, each of the status 304a, data type collected 304b, collections summary report 304c, top collections by case 304d, etc., may be displayed graphically as a chart.

Figure 3C:
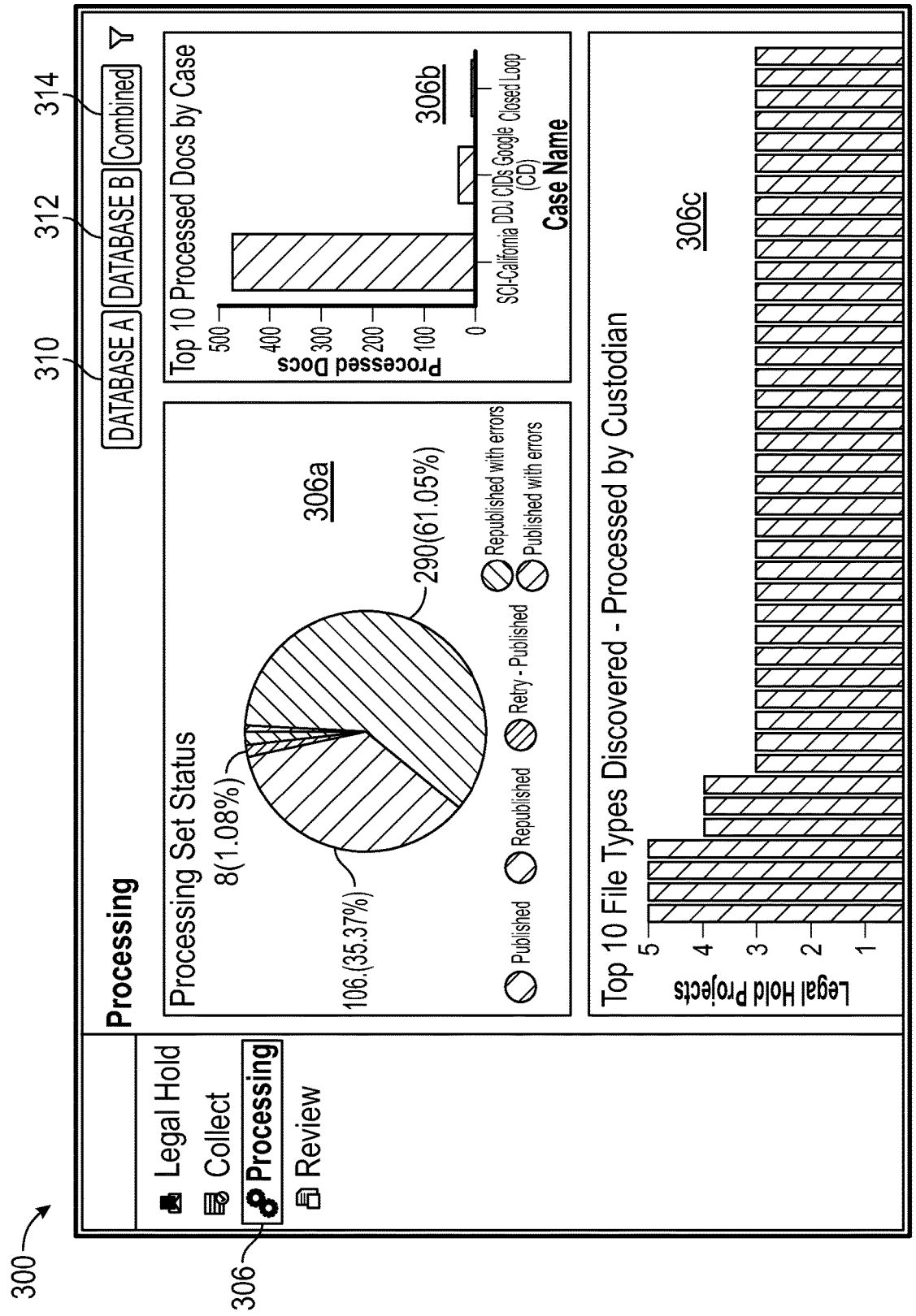

Referring to FIG. 3C, the GUI 300 may also display data insights including processing sets 306. For example, the processing sets 306 may include processing set status 306a, top processed documents by case 306b, top file types discovered 306c, etc. According to aspects, each of the processing set status 306a, top processed documents by case 306b, top file types discovered 306c, etc., may be displayed graphically as a chart.

Figure 3D:
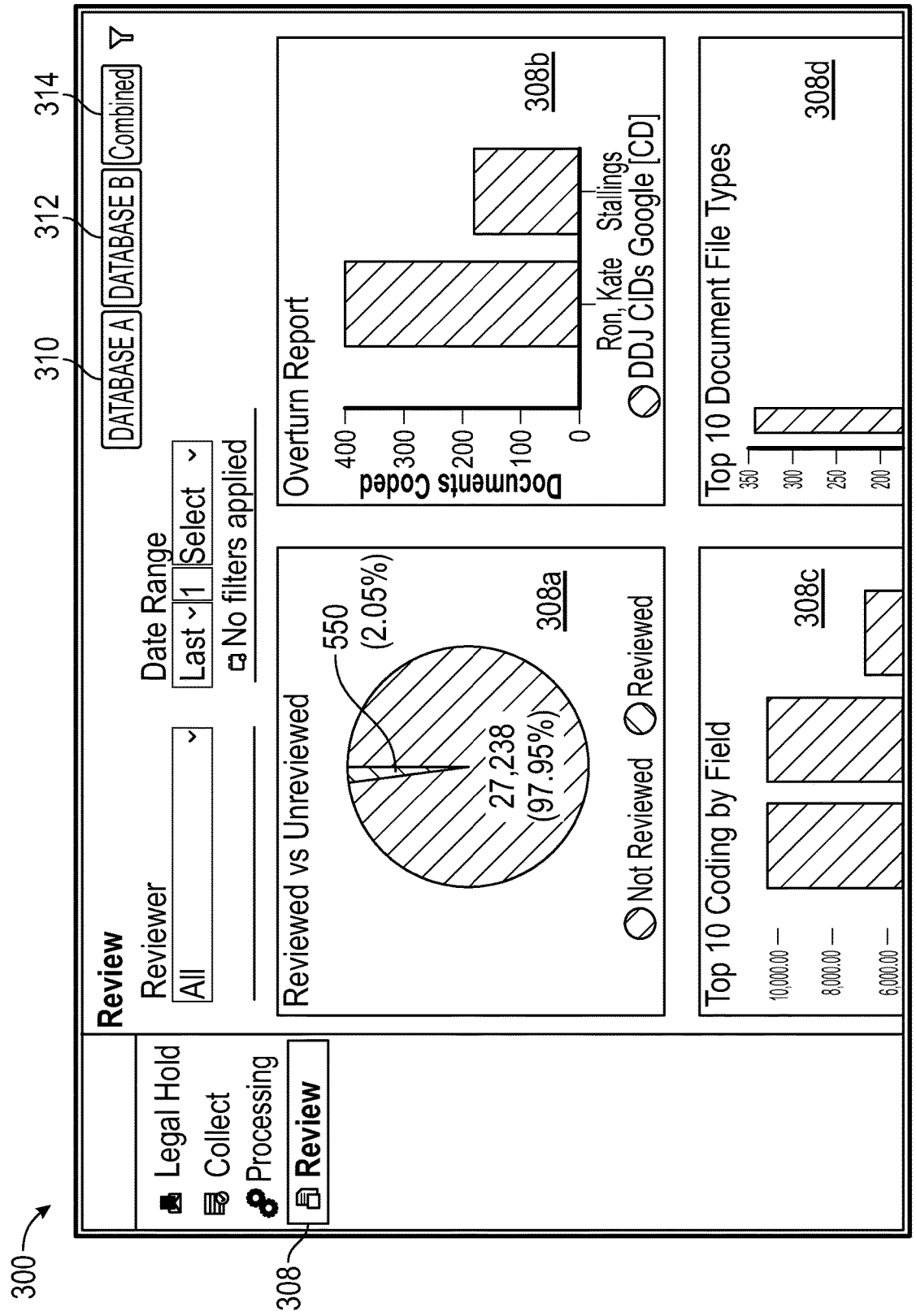

Referring to FIG. 3D, the GUI 300 may also display data insights including review sets 308. For example, the review sets 308 may include reviewed vs. unreviewed 308a, overturn report 308b, top coding by field 308c, top document file types 308d, etc. According to aspects, each of the reviewed vs. unreviewed 308a, overturn report 308b, top coding by field 308c, top document file types 308d, etc., may be displayed graphically as a chart.

It is understood that the illustrated data insight charts of FIGS. 3A-3D are exemplary only, and various other types of charts/diagrams/visualizations may be utilized without departing from the scope of the disclosure.

According to additional aspects, any of the data insights, including but not limited to, legal holds 302, collections 304, processing sets 306, and/or review sets 308 may be sorted/grouped based on data from either a first database 310 (e.g., MICROSOFT® ADVANCED E-DISCOVERY), a second database 312 (e.g., RELATIVITY®), or both 314 (e.g., combined).

According to additional aspects, each of the GUIs 300 may be sorted/grouped based on client/counsel, case name, custodian name, date, etc. According to aspects, the GUIs 300 may be generated based on the access table 120. Since the reports are displayed from multiple platforms, different security groups are used by those platforms to make sure the row-level security is applied appropriately.

Figure 4:
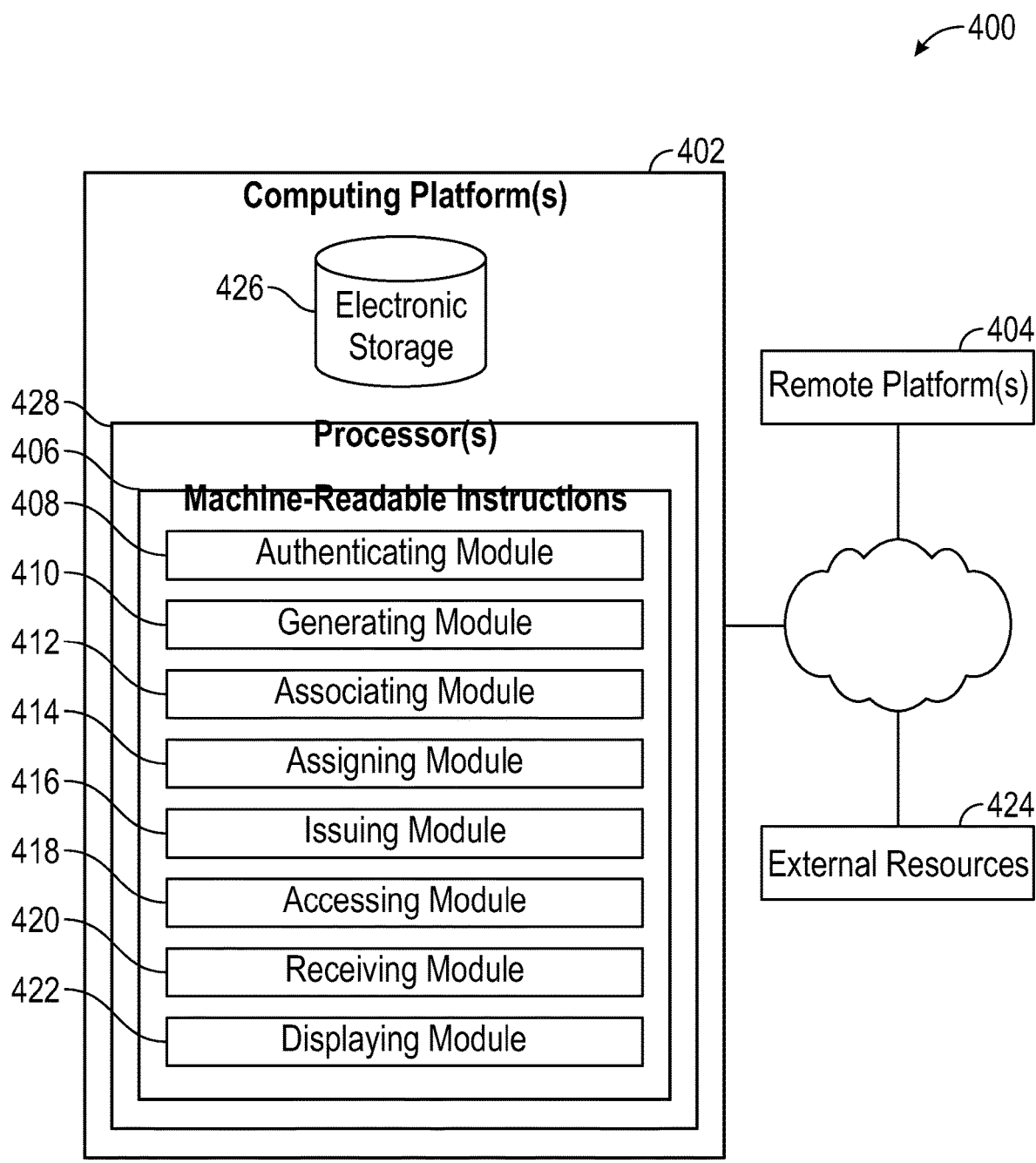
FIG. 4 illustrates a system configured for granting access to cases for users, in accordance with one or more implementations.

FIG. 4 illustrates a system 400 configured for granting access to cases for users through a common data model that brings together data from multiple e-discovery applications, in accordance with one or more implementations. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 may be configured by machine-readable instructions 406. Machine-readable instructions 406 may include one or more instruction modules. The instruction modules may include computer program modules. The instruction modules may include one or more of authenticating module 408, generating module 410, associating module 412, assigning module 414, issuing module 416, accessing module 418, receiving module 420, and/or displaying module 422, and/or other instruction modules.

Authenticating module 408 may be configured to authenticate a user based on at least an access link.

Generating module 410 may be configured to generate data insights regarding at least one case number. Generating module 410 may also be configured to generate an access table comprising at least the case number and the contact information of the at least one user.

Associating module 412 may be configured to associate at least one user of a plurality of users with at least one case number. Associating module 412 may also be configured to associate contact information of the at least one user with the at least one case number.

Assigning module 414 may be configured to assign a case name to each case number.

Issuing module 416 may be configured to issue an access link to the at least one user, in response to receiving a request.

Accessing module 418 may be configured to grant access, for the at least one user, to the at least one case number based on the contact information of the at least one user.

Receiving module 420 may be configured to receive a request to access the at least one case number from the at least one user. Receiving module 420 may also be configured to receive the contact information for each user of the plurality of users.

Displaying module 422 may be configured to cause display of the data insights through a user interface.

According to aspects, the contact information comprises at least one of a first name, a last name, and/or an e-mail address. According to aspects, the at least one case number is unique from other case numbers. According to aspects, the case name is unique from other case names.

According to aspects, the access link comprises at least a unique URL. According to aspects, the at least one user accesses the cases through a hosted instance.

According to aspects, the hosted instance comprises a user hosted instance. According to aspects, the hosted instance comprises a native hosted instance.

According to aspects, the accessing module 418 may also be configured to maintain client privileges of other users when accessing the at least one case number.

In some implementations, computing platform(s) 402, remote platform(s) 404, and/or external resources 424 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 424 may be operatively linked via some other communication media.

A given remote platform 404 may include one or more processors configured to execute computer program modules. The computer program modules may be configured to enable an expert or user associated with the given remote platform 404 to interface with system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 424 may include sources of information outside of system 400, external entities participating with system 400, and/or other resources. In some implementations, some or all of the functionality attributed herein to external resources 424 may be provided by resources included in system 400.

Computing platform(s) 402 may include electronic storage 426, one or more processors 428, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 426 may comprise non-transitory storage media that electronically stores information. The electronic storage media of electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from computing platform(s) 402, information received from remote platform(s) 404, and/or other information that enables computing platform(s) 402 to function as described herein.

Processor(s) 428 may be configured to provide information processing capabilities in computing platform(s) 402. As such, processor(s) 428 may include one or more of a digital processor, an analog processor, a digital circuit designed to process information, an analog circuit designed to process information, a state machine, and/or other mechanisms for electronically processing information. Although processor(s) 428 is shown in FIG. 4 as a single entity, this is for illustrative purposes only. In some implementations, processor(s) 428 may include a plurality of processing units. These processing units may be physically located within the same device, or processor(s) 428 may represent processing functionality of a plurality of devices operating in coordination. Processor(s) 428 may be configured to execute modules 408, 410, 412, 414, 416, 418, 420, and/or 422, and/or other modules. Processor(s) 428 may be configured to execute modules 408, 410, 412, 414, 416, 418, 420, and/or 422, and/or other modules by software, hardware, firmware, some combination of software, hardware, and/or firmware, and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, 418, 420, and/or 422 are illustrated in FIG. 4 as being implemented within a single processing unit, in implementations in which processor(s) 428 includes multiple processing units, one or more of modules 408, 410, 412, 414, 416, 418, 420, and/or 422 may be implemented remotely from the other modules. The description of the functionality provided by the different modules 408, 410, 412, 414, 416, 418, 420, and/or 422 described below is for illustrative purposes, and is not intended to be limiting, as any of modules 408, 410, 412, 414, 416, 418, 420, and/or 422 may provide more or less functionality than is described. For example, one or more of modules 408, 410, 412, 414, 416, 418, 420, and/or 422 may be eliminated, and some or all of its functionality may be provided by other ones of modules 408, 410, 412, 414, 416, 418, 420, and/or 422. As another example, processor(s) 428 may be configured to execute one or more additional modules that may perform some or all of the functionality attributed below to one of modules 408, 410, 412, 414, 416, 418, 420, and/or 422.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
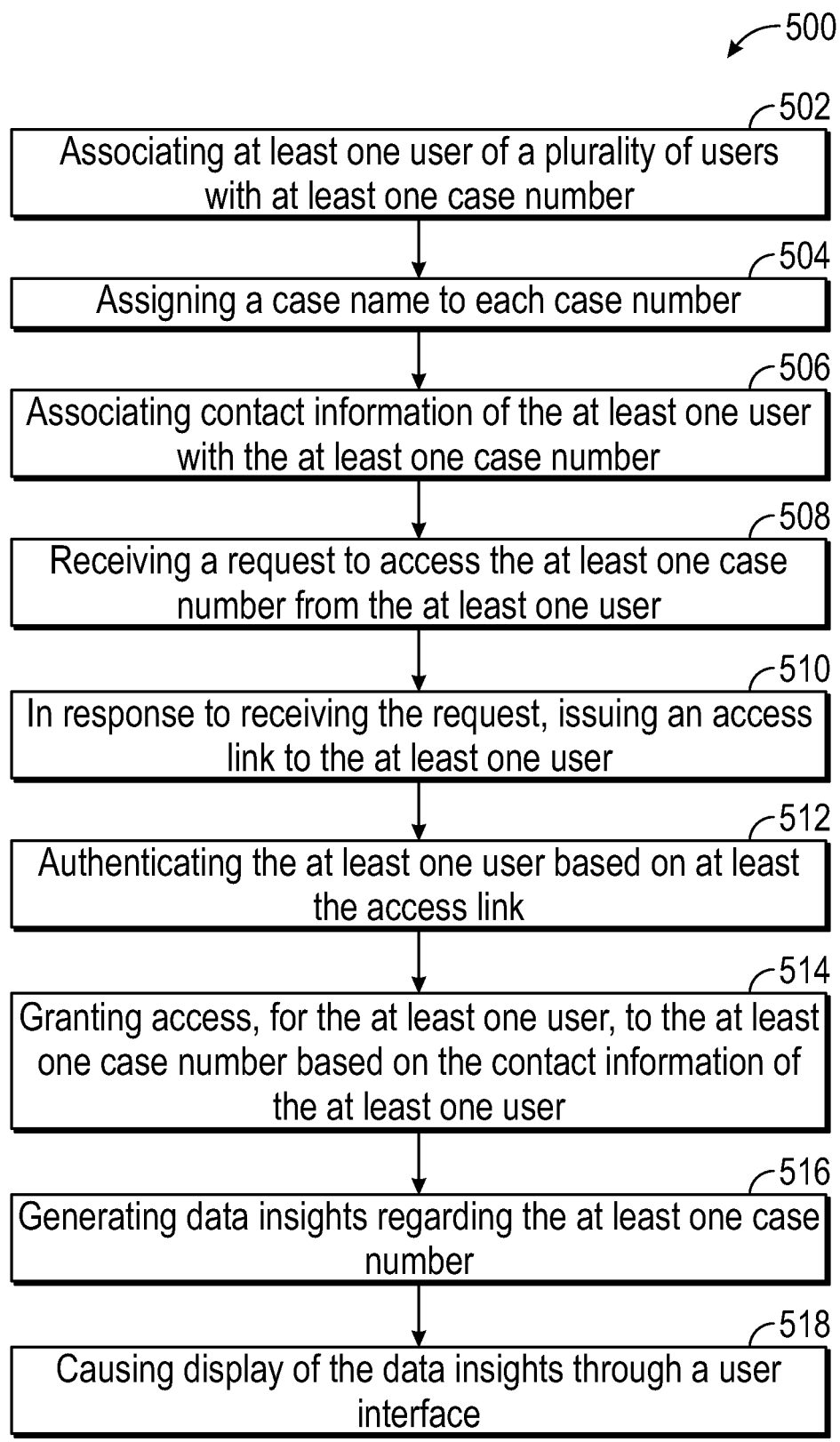
FIG. 5 illustrates an example flow diagram for granting access to cases for users, according to certain aspects of the present disclosure.

FIG. 5 illustrates an example flow diagram (e.g., process 500) for granting access to cases for users through a common data model that brings together data from multiple e-discovery applications, according to certain aspects of the disclosure. For explanatory purposes, the example process 500 is described herein with reference to FIGS. 1-4. Further for explanatory purposes, the steps of the example process 500 are described herein as occurring in serial, or linearly. However, multiple instances of the example process 500 may occur in parallel. For purposes of explanation of the subject technology, the process 500 will be discussed in reference to FIGS. 1-4.

At step 502, at least one user of a plurality of users is associated with at least one case number.

At step 504, a case name is assigned to each case number.

At step 506, contact information of the at least one user is associated with the at least one case number.

At step 508, a request to access the at least one case number from the at least one user is received.

At step 510, in response to receiving the request, an access link is issued to the at least one user.

At step 512, the at least one user is authenticated based on at least the access link.

At step 514, the at least one user is granted access to the at least one case number based on the contact information of the at least one user.

At step 516, data insights are generated regarding the at least one case number.

At step 518, the data insights are displayed through a user interface.

For example, as described above in relation to FIGS. 1-4, at step 502, at least one user (e.g., user 102a of FIG. 1A) of a plurality of users (e.g., users 110 of FIG. 1B) is associated with at least one case number (e.g., case number 104 of FIG. 1A). At step 504, a case name (e.g., case name 106 of FIG.

1A) is assigned (e.g., via assigning module 414 of FIG. 4) to each case number. At step 506, contact information (e.g., emails 112 of FIG. 1B) of the at least one user is associated with the at least one case number (e.g., via access table 120 of FIG. 1C). At step 508, a request to access the at least one case number from the at least one user is received (e.g., via receiving module 420). At step 510, in response to receiving the request, an access link is issued to the at least one user (e.g., via issuing module 416 of FIG. 4). At step 512, the at least one user is authenticated based on at least the access link (e.g., in either an admin hosted or client hosted instance of FIGS. 2A and 2B). At step 514, the at least one user is granted access to the at least one case number based on the contact information of the at least one user (e.g., data is displayed via GUI 300 of FIGS. 3A-3D). At step 516, data insights are generated regarding the at least one case number (e.g., via GUI 300 of FIGS. 3A-3D). At step 518, the data insights are displayed through a user interface (e.g., via GUI 300 of FIGS. 3A-3D).

According to aspects, the contact information comprises at least one of a first name, a last name, and/or an e-mail address. According to aspects, the at least one case number is unique from other case numbers. According to aspects, the case name is unique from other case names.

According to aspects, the access link comprises at least a unique URL. According to aspects, the at least one user accesses the cases through a hosted instance.

According to aspects, the hosted instance comprises a user hosted instance. According to aspects, the hosted instance comprises a native hosted instance.

According to aspects, the process 500 further includes receiving the contact information for each user of the plurality of users. The process 500 further includes generating an access table comprising at least the case number and the contact information of the at least one user.

According to aspects, the process 500 further includes maintaining client privileges of other users when accessing the at least one case number. In an implementation, the client privileges are maintained through the access table.

Figure 6:
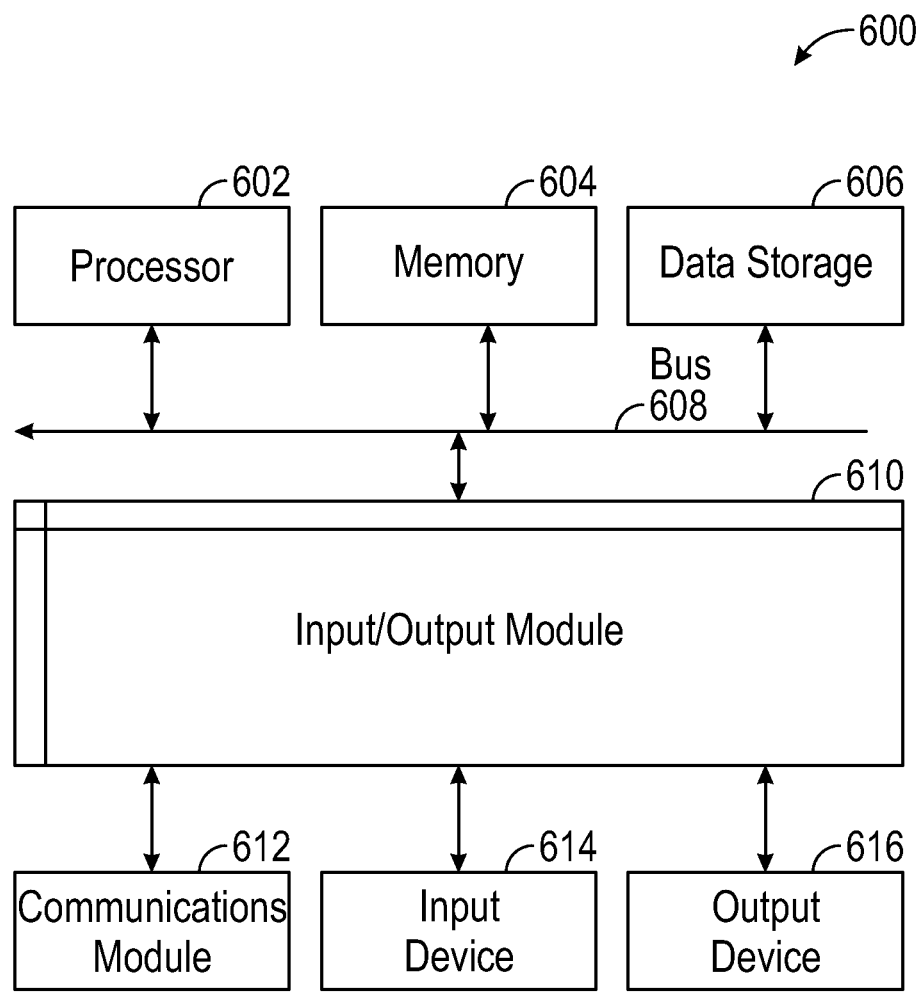
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads data, information may be read from the data and stored in a memory device, such as the memory 604. Additionally, data from the memory 604 servers accessed via a network, the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for granting access to cases for users through a common data model that brings together data from multiple e-discovery applications, comprising:
    associating at least one user of a plurality of users with at least one case number;
    assigning a case name to each case number;
    associating contact information of the at least one user with the at least one case number;
    receiving a request to access the at least one case number from the at least one user;
    in response to receiving the request, issuing an access link to the at least one user;
    authenticating the at least one user based on at least the access link;
    granting an access, for the at least one user, to the at least one case number based on the contact information of the at least one user;
    generating first data insights regarding the at least one case number according to data from a first database of a first e-discovery application and a second database of a second e-discovery application;
    causing display of the first data insights through a user interface;
    causing display of a first interactive element associated with the first database, a second interactive element associated with the second database, and a third interactive element associated with the first and the second databases;
    based on a user interaction with one of the first, second, or third interactive element, generating second data insights according to data from one of the first database, the second database, or the first and second databases combined; and
    causing display of the second data insights through the user interface.

2. The computer-implemented method of claim 1, further comprising:
    receiving the contact information for each user of the plurality of users.

3. The computer-implemented method of claim 1, wherein the contact information comprises at least one of a first name, a last name, and/or an e-mail address.

4. The computer-implemented method of claim 1, wherein the at least one case number is unique from other case numbers.

5. The computer-implemented method of claim 1, wherein the case name is unique from other case names.

6. The computer-implemented method of claim 1, further comprising:
    generating an access table comprising at least the case number and the contact information of the at least one user.

7. The computer-implemented method of claim 1, wherein the access link comprises at least a unique URL.

8. The computer-implemented method of claim 1, wherein the at least one user accesses the cases through a hosted instance.

9. The computer-implemented method of claim 8, wherein the hosted instance comprises at least one of a user hosted instance and/or a native hosted instance.

10. The computer-implemented method of claim 1, further comprising:
    maintaining client privileges of other users when accessing the at least one case number.

11. A system for granting access to cases for users through a common data model that brings together data from multiple e-discovery applications, comprising:
    a processor; and
    a memory comprising instructions stored thereon, which when executed by the processor, causes the processor to perform:
        associating at least one user of a plurality of users with at least one case number;
        assigning a case name to each case number;
        associating contact information of the at least one user with the at least one case number;
        receiving a request to access the at least one case number from the at least one user;
        in response to receiving the request, issuing an access link to the at least one user;
        authenticating the at least one user based on at least the access link;
        granting an access, for the at least one user, to the at least one case number based on the contact information of the at least one user;
        generating first data insights regarding the at least one case number according to data from a first database of a first e-discovery application and a second database of a second e-discovery application;
        causing display of the first data insights through a user interface;
        causing display of a first interactive element associated with the first database, a second interactive element associated with the second database, and a third interactive element associated with the first and the second databases;
        based on a user interaction with one of the first, second, or third interactive element, generating second data insights according to data from one of the first database, the second database, or the first and second databases combined; and causing display of the second data insights through the user interface.

12. The system of claim 11, further comprising stored sequences of instructions, which when executed by the processor, cause the processor to perform:
receiving the contact information for each user of the plurality of users.

13. The system of claim 11, wherein the contact information comprises at least one of a first name, a last name, and/or an e-mail address.

14. The system of claim 11, wherein the at least one case number is unique from other case numbers.

15. The system of claim 11, wherein the case name is unique from other case names.

16. The system of claim 11, further comprising stored sequences of instructions, which when executed by the processor, cause the processor to perform:
generating an access table comprising at least the case number and the contact information of the at least one user.

17. The system of claim 11, wherein the access link comprises at least a unique URL.

18. The system of claim 11, wherein the at least one user accesses the cases through a hosted instance.

19. The system of claim 18, wherein the hosted instance comprises a user hosted instance and/or a native hosted instance.

20. A non-transitory computer-readable storage medium comprising instructions stored thereon, which when executed by one or more processors, cause the one or more processors to perform a method for granting access to cases for users through a common data model that brings together data from multiple e-discovery applications, the method comprising:

associating at least one user of a plurality of users with at least one case number;

assigning a case name to each case number;

associating contact information of the at least one user with the at least one case number;

receiving a request to access the at least one case number from the at least one user;

in response to receiving the request, issuing an access link to the at least one user;

authenticating the at least one user based on at least the access link;

granting an access, for the at least one user, to the at least one case number based on the contact information of the at least one user;

generating first data insights regarding the at least one case number according to data from a first database of a first e-discovery application and a second database of a second e-discovery application;

causing display of the first data insights through a user interface;

causing display of a first interactive element associated with the first database, a second interactive element associated with the second database, and a third interactive element associated with the first and the second databases;

based on a user interaction with one of the first, second, or third interactive element, generating second data insights according to data from one of the first database, the second database, or the first and second databases combined; and causing display of the second data insights through the user interface.

* * * * *